United States Patent Office.

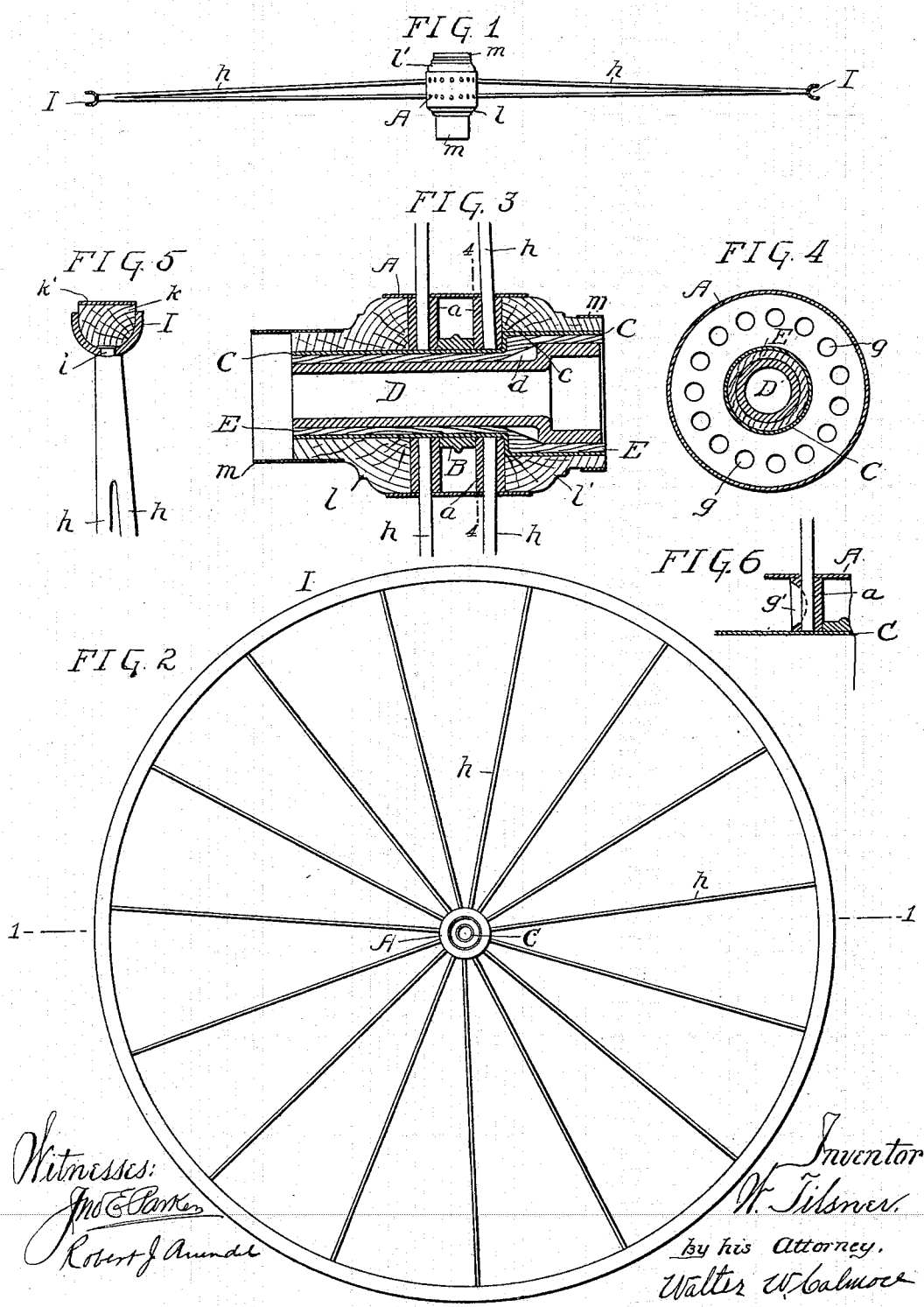

WILHELM TILSNER, OF PHILADELPHIA, PENNSYLVANIA, ASSIGNOR TO HARRY J. FRANK, OF SAME PLACE.

VEHICLE-WHEEL.

SPECIFICATION forming part of Letters Patent No. 612,368, dated October 11, 1898.

Application filed September 21, 1897. Serial No. 652,421. (No model.)

*To all whom it may concern:*

Be it known that I, WILHELM TILSNER, a subject of the Emperor of Germany, residing at Philadelphia, in the county of Philadelphia and State of Pennsylvania, have invented certain new and useful Improvements in Wheels for Vehicles, of which the following is a specification, reference being had therein to the accompanying drawings.

My invention relates to certain improvements in wheels for carriages, wagons, and other vehicles, and has for its object to provide an improved form of wheel of much more durable character than the ordinary type of wooden wheel, which will not shrink in hot climates nor rot or swell in wet weather, and in which the weight will be materially reduced and at the same time the wheel will have the general appearance of an ordinary wooden wheel.

In the accompanying drawings, Figure 1 is a sectional plan view, on the line 1 1, Fig. 2, of a wheel constructed in accordance with my invention. Fig. 2 is an elevation of the same. Fig. 3 is a sectional view of the hub on an enlarged scale. Fig. 4 is a transverse sectional elevation of the same on the line 4 4, Fig. 3. Fig. 5 is an enlarged sectional view of the felly, and Fig. 6 is a sectional detail of a modification.

Referring to the drawings, A represents a cylindrical steel casing, in which are situated two rings $a$, held at a short distance from each other by a spacing-ring $b$. Within the rings $a$ is a cylinder C, having one of its ends $c$ somewhat enlarged to permit the entrance of the head of the usual metallic axle-box D. The diameter of the cylinder C is slightly greater than the diameter of the box D, and between the two is placed a wooden ring E for convenience in inserting and removing the box D and to permit of the binding of its holding-lugs $d$.

Each of the rings $a$ is provided with a number of openings $g$ to reduce weight and to permit of the introduction of brazing metal between the rings, and in each ring, between the openings $g$, are formed radial openings for the introduction of the spokes $h$, fifteen in the present instance, each spoke extending through the outer casing A and through the rings $a$.

In assembling the parts the cylinder C, casing A, rings $a$, spacing-ring $b$, and the spokes are first placed in position, after which brazing metal is introduced through the openings $g$ in rings $a$, and the whole structure is then heated and brazed together.

In the modified construction illustrated in Fig. 6 the rings $a'$ are provided with grooves $g'$ in lieu of the openings $g$, and the brazing metal may be poured within these grooves to unite the spokes to the rings.

The spokes $h$ are formed in pairs, and all those on the outer side of the wheel away from the vehicle are in a perfectly vertical plane, while those on the inner side of the wheel are arranged at an angle, so as to present a "dished" appearance.

At the felly end of the spokes the pairs are united, as shown in Fig. 5, and from their ends projects a pin $i$, which is passed through the felly I and riveted and brazed to said felly.

The tire may be of rubber, or, as shown in Fig. 5, a filling of wood $k$, having an ordinary iron tire $k'$, may be placed in the felly.

After the wheel has been thus far manufactured wooden rings I I', having the usual metal rings $m$, are placed over the cylinder C in order to give the hubs the appearance of the ordinary wooden article. The wooden fillings E and box D are then placed in position and the wheel is complete.

If necessary, the spokes instead of being in two parts may be in one piece and have end pins for insertion in the rings $a$, or may be made in three sections, if desired.

Having thus described my invention, what I claim, and desire to secure by Letters Patent, is—

1. A wheel comprising a hub and felly, and spokes extending between the two, said spokes being arranged in pairs, those on the outer side of the wheel being in a vertical plane and those on the inner side of the wheel extending at an angle between the hub and felly, the spokes comprising each pair being in the same plane and being connected together at the felly end, substantially as specified.

2. In a wheel, the combination of the outer casing, the inner metallic cylinder-rings between the two, spokes passing through the rings and casing, and a felly to which the outer ends of the spokes are secured.

3. The combination, in a wheel-hub of the casing, the inner cylinder, perforated metallic rings between the two, a spacing-ring *b*, an inner wooden lining, and an axle-box held in said wooden lining.

4. The combination, in a wheel-hub of the casing A, rings *a* within the same, a spacing-ring *b*, an inner cylinder C, wooden rings surrounding and lining the said cylinder, and an inner axle-box D, substantially as specified.

5. In a wheel, the casing A, rings *a* spokes passing through the casing and rings, an inner cylinder C and a felly I to which the outer ends of the spokes are secured.

In testimony whereof I affix my signature in the presence of two witnesses.

WILHELM TILSNER.

Witnesses:
JNO. A. MCCARTHY,
WALTER W. CALMORE.